Aug. 14, 1923.
J. E. EMOND
1,465,164
ADJUSTABLE HEADLIGHT AND DIRECTION INDICATOR FOR AUTOMOBILES
Filed Jan. 18, 1922
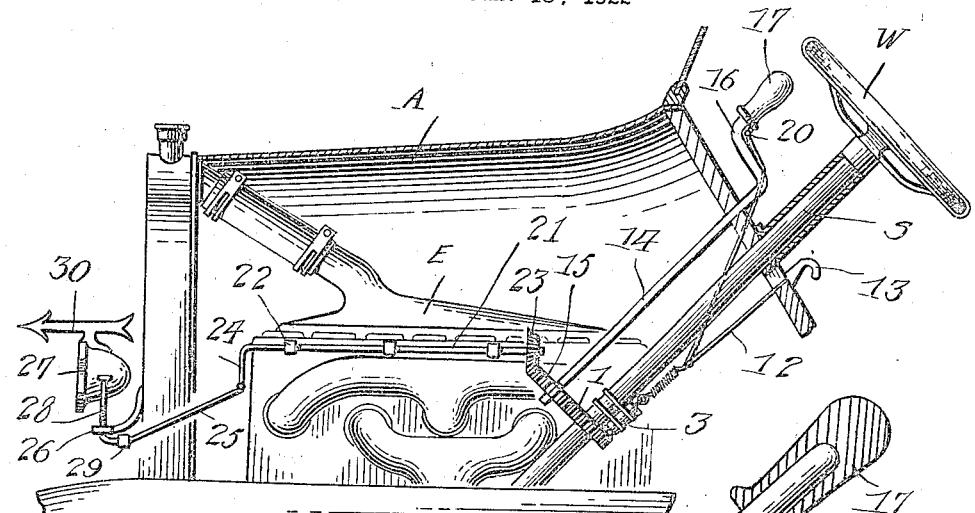
Fig. 1
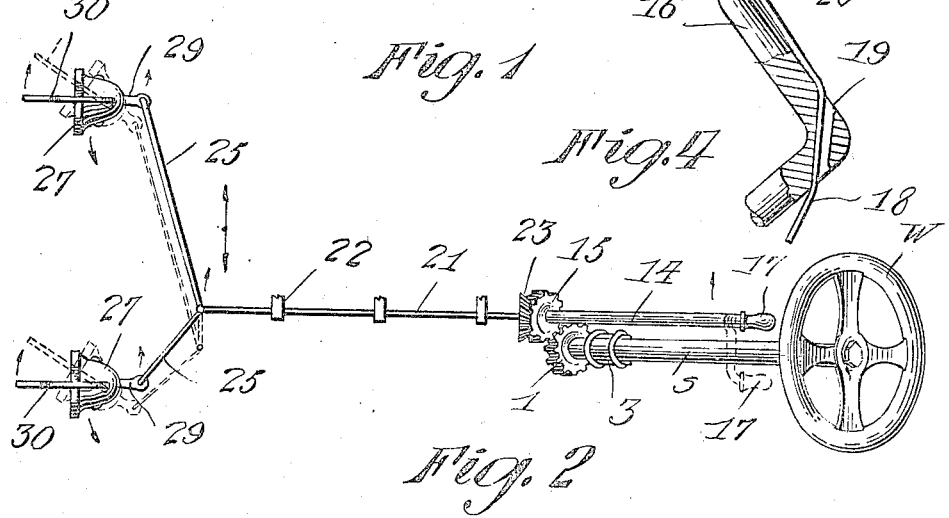
Fig. 2
Fig. 4
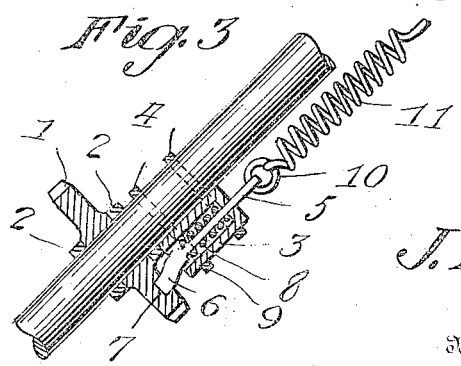
Fig. 3
Inventor
J. Ernest Emond
By William Clinton
Attorney Patented Aug. 14, 1923.

1,465,164

UNITED STATES PATENT OFFICE.

JOSEPH ERNEST EMOND, OF WINDSOR MILLS, QUEBEC, CANADA.

ADJUSTABLE HEADLIGHT AND DIRECTION INDICATOR FOR AUTOMOBILES.

Application filed January 18, 1922. Serial No. 530,106.

*To all whom it may concern:*

Be it known that I, JOSEPH ERNEST EMOND, a subject of the King of Great Britain, residing at Windsor Mills, Province of Quebec, Canada, have invented certain new and useful Improvements in Adjustable Headlights and Direction Indicators for Automobiles; and I do hereby declare that the following is a full, clear, and exact description of the invention, such as will enable others skilled in the art to which it appertains to make and use the same.

This invention relates to adjustable headlights and direction indicators for automobiles.

The primary object of this invention is to provide a device for directing the head light of an automobile in the direction in which the automobile is proceeding, by manipulation of the steering wheel.

Another object is to provide means for turning the head lights of an automobile to point in the same direction as the forward wheels.

Still another object of the invention is to provide a device for steering an automobile in case the steering wheel is out of order.

The invention consists in the novel arrangement of parts illustrated in the accompanying drawings in which:

Figure 1 is a side elevation of the front portion of an automobile with my invention applied thereto;

Figure 2 is a plan view of the device per se;

Figure 3 is a detail partly in section of the locking means; and,

Figure 4 is a detail partly in section of the crank and handle applied thereto.

Referring to the drawings in which like reference characters denote corresponding parts, A indicates the hood of an automobile in which is disposed an engine E. S is the steering shaft having at its upper end a steering wheel W. Loosely mounted on the steering shaft S near the low end thereof is a gear 1 held against sliding movement of the shaft by means of rings 2, 2. A casing 3 is mounted upon the shaft by means of bands 4, 4; passing through said casing is a rod 5 terminating at its lower end in a dog 6 adapted to engage a slot 7 in the face of the gear 1. Disposed within said casing is an expansion spring 8 bearing against the top of the casing and the shoulder 9 formed between the rod 5 and the dog 6. The other end of said rod 5 terminates in an eye 10 to which is secured a spring 11. A link 12 extends from the end of the spring 11 to the dash board, and terminates in a finger hook 13.

A shaft 14 is disposed in parallel relation with the steering rod S and is provided at one end with a gear 15 meshing with the gear 7, and at the other end which projects through the dash board and is within reach of the driver, with a crank 16 upon which is mounted an independently rotatable handle 17. At the point where the link 12 joins the spring 11 a cable 18 is fastened to said spring, passes through a perforation 19 in the crank 16, and is joined to the handle 17 by means of a link 20.

A horizontal rod 21 is secured to the casing of the engine E by means of eye bolts 22 which are of the same diameter and thread as the bolts that are ordinarily to be found on an engine casing. When it is desired to secure said rod 21 to the casing, it is only necessary to remove the ordinary bolts and to insert the eye-bolts 22 in their place. The rod 21 is then passed through the eyes of the bolts. Said rod 21 carries at its rear end a bevel gear 23 which meshes with the gear 15. The opposite end of said rod is provided with a downwardly extending vertical portion 24. At the end of said portion 24 are two forwardly and downwardly extending arms 25 which terminate exterior of the hood. Mounted upon some stationary part of the automobile at the forward end thereof are two brackets 26 in each of which is rotatably supported a head light 27 by means of a rod 28. Each rod 28 is joined to an arm 25 by means of a link 29, there being a pivotal connection between the arm and the link.

In operation, the automobile is steered in the ordinary manner by turning the steering wheel W which rotates the steering shaft S. As the shaft S is turned, the dog 6 actuates the gear 1 which, and through the gears 15 and 23, rotates the rod 21 and imparts a swinging motion to the end portion 24 in a vertical plane. This motion of the end portion 24 causes oscillation of the arms 25 which results in the turning of the rods 28 in a vertical plane, each about its end axis. The head lights 27 are likewise turned in horizontal planes.

Each head light may be provided with a pointer 30 to indicate the direction in which the forward wheels of the automobile are turning or the direction in which the automobile is proceeding.

When it is desired to disconnect the indicating means from the steering rod, this may be effected by pulling upward on the finger hook 13 or by turning the handle 17, either of which operations releases the dog 6 from the notch 7 in the gear 1. The gear 1 then remains stationary when the shaft S is turned, because said gear is loosely mounted upon the shaft.

Should the steering wheel W become damaged so that the shaft S cannot be turned by it, the automobile may be steered by rotating the crank 16. Rotation will thus be imparted to the shaft S and to the rod 21 through the gears 1 and 23 respectively through the medium of gear 15.

When it is desired to actuate the indicating means independently of the steering wheels, whether or not the steering wheel W is in order, the handle 17 is turned, whereupon the dog 6 is unlocked from the steering shaft, and the crank 16 is rotated to effect movement of the indicating means.

Having thus fully described the invention, what I claim as new and desire to protect by Letters Patent is:—

1. In a vehicle, a steering post, a gear mounted on said post, a rod adjacent said post, a second gear at one end of said rod and meshing with the first named gear, an indicator mounted upon said vehicle, means for actuating said indicator when the rod is moved, said connection comprising a shaft connected at one end with the indicator and carrying at its outer end a pinion meshing with the second named gear.

2. In a vehicle, a steering post, a gear loosely mounted on said post, means for normally locking said gear to the post, a shaft disposed adjacent the post and provided with a gear adapted to mesh with the first named gear, and an indicating mechanism operatively associated with said second named gear.

3. In a vehicle, a steering post, a gear loosely mounted on said post, means for normally locking said gear to the post, a shaft disposed adjacent said post and provided with a gear adapted to mesh with the first named gear, an indicating mechanism operatively associated with the second named gear, and means associated with the shaft for unlocking the first named gear from the steering post.

4. In a vehicle, a steering post, a gear loosely mounted on said post, a dog secured to the post and adapted to lock the gear, a shaft disposed adjacent said post, a handle for rotating said shaft, a gear secured to said shaft and adapted to mesh with the first named gear, an indicating mechanism operatively associated with the second named gear, and a flexible connection between the dog and the handle.

In witness whereof I have hereunto set my hand.

JOSEPH ERNEST EMOND.